United States Patent [19]

Ward et al.

[11] Patent Number: 4,513,525
[45] Date of Patent: Apr. 30, 1985

[54] FISHING BUCKET

[76] Inventors: Mai Ward; Carmen Ward, both of 104 Imperial St. South, Massey, Ontario P0P 1P0, Canada

[21] Appl. No.: 493,633

[22] Filed: May 11, 1983

[51] Int. Cl.³ ............................................. A01K 97/04
[52] U.S. Cl. ............................................. 43/55; 43/56
[58] Field of Search ...................... 43/54.1, 55, 56, 57; 220/409, 410, 94 R; D22/22; 261/121 M

[56] References Cited

U.S. PATENT DOCUMENTS

| D. 235,205 | 5/1975 | Schwartz | D22/22 |
| 964,720 | 7/1910 | Wegner | 220/94 R |
| 2,272,561 | 2/1942 | Hubbell | 43/56 |
| 2,500,466 | 3/1950 | Myers | 220/94 R |
| 2,954,891 | 10/1960 | Imber | 220/410 |
| 3,191,337 | 6/1965 | Fant | 43/57 |
| 3,452,469 | 7/1969 | White | 43/55 |
| 3,918,582 | 11/1975 | Wallace | 220/94 R |

Primary Examiner—Kuang Y. Lin
Assistant Examiner—C. McKee

[57] ABSTRACT

The present invention provides a container assembly for receiving fishing minnows and the like. The assembly comprises an outer bucket, a removeable lid for sealing the bucket, a handle for carrying the bucket and a strainer basket for fitting inside the bucket. The strainer basket has a pair of handle portions which are detachable from one another and which can be moved to an out of the way position for gaining access into the basket.

6 Claims, 4 Drawing Figures

FISHING BUCKET

FIELD OF THE INVENTION

The present invention relates to a container assembly comprising an outer bucket and an inner basket particularly suitable for use by ice fishermen for receiving fishing minnows.

BACKGROUND OF THE INVENTION

According to conventional practice most ice fishermen carry their minnows in a water filled plastic bag. These plastic bags are often subject to damage resulting in loss of the minnows. In order to retrieve the minnows from the bag, one must generally have to place his or her hands into the icy cool water within the bag to retrieve the minnows.

SUMMARY OF THE PRESENT INVENTION

The present invention relates to a container assembly for mitigating the problems described above. The container assembly of the present invention which is particularly suitable for receiving fishing minnows and the like comprises an outer protective bucket, a removeable lid for sealing the bucket, handle means for carrying the bucket and a strainer basket for fitting inside the bucket. The strainer basket has a pair of handle portions adapted to detachably engage one another for lifting the basket from the bucket to strain the water while trapping minnows in the basket. Accordingly one does not have to put his or her hands into the icy cold water in order to retrieve the minnows.

When the handle portions are detached from one another they are moveable to an out of the way position for readily gaining access to the interior of the basket once it has been removed from the bucket.

BRIEF DISCUSSION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS

Figure 1:
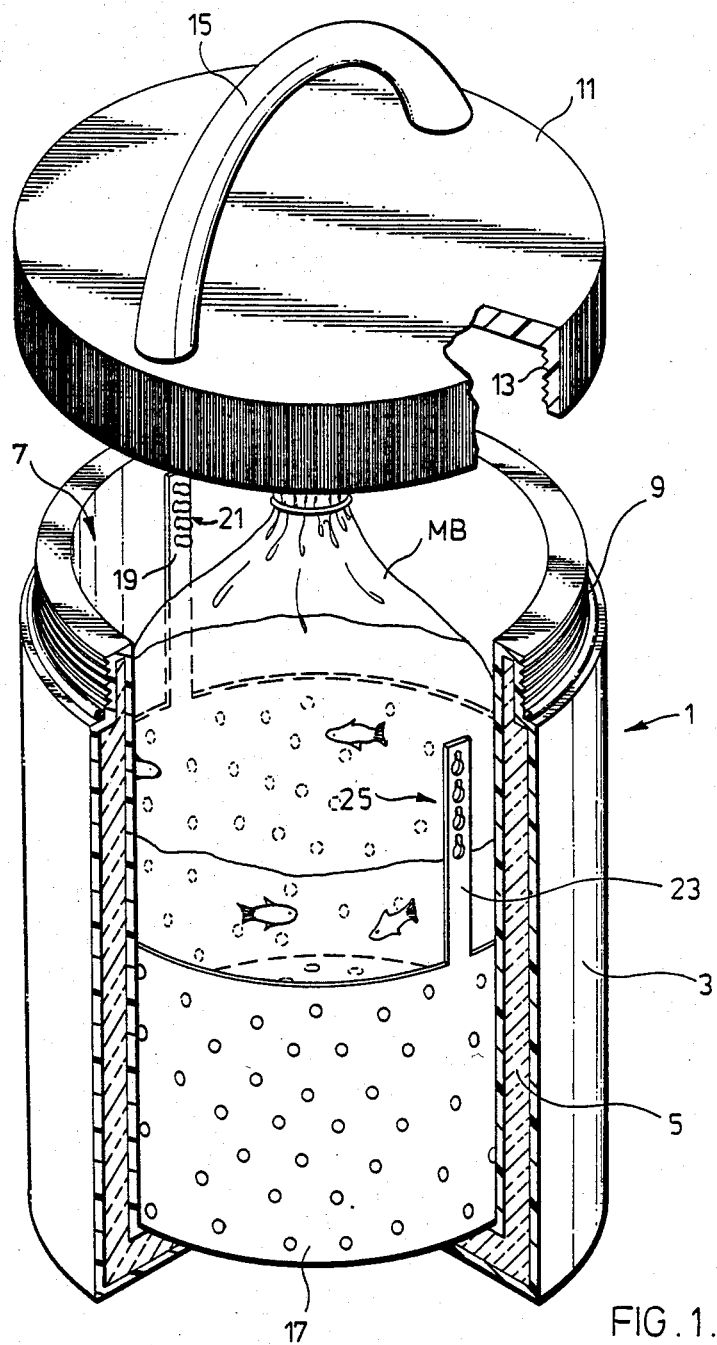
FIG. 1 is an exploded and partially section end perspective view of a container assembly holding a bag of minnows according to a preferred embodiment of the present invention.

FIG. 1 shows a container assembly generally indicated at 1 carrying a minnow bag MB. As described above in accordance with conventional practice such minnow bags are generally carried in an unprotected manner where they are exposed to damage resulting in either leaking of the water or loss of the minnows from the bag.

However, in accordance with the present invention the minnow bag is carried in a protected manner within a bucket 3 having an open upper end 7 which is sealed by means of a lid 11. Bucket 3 includes threads 9 which mate with threads 13 on the lid for complete sealing of the interior contents of the bucket. These threads are set up in a manner to enhance easy alignment of the threading action of the lid into the bucket.

In this particular application bucket 3 and lid 11 are specifically adapted for ice fishing purposes. Accordingly the bucket has an insulated wall 5 extending both around and at the base of the bucket. As is well shown in the drawings lid 11 is also insulated to prevent freezing of both the water and the minnows in the minnow bag when it is located within the interior of the bucket.

Lid 11 is provided with a tubular handle 15 which is fixed centrally across the top of the lid and widened at its ends for strengthening of the handle at the attachment to the lid. This handle which has a rounded cross-section for comfort provides for a very easy balanced carrying of the overall container assembly. As can be seen in the drawings, threads 9 are located to the outside of the bucket for receiving the lid. With this arrangement the water inside the bucket cannot splash up into the threads which might otherwise result in freezing of the lid to the bucket. In addition a small inwardly extending shoulder can be provided near the upper end of the inside of the bucket to further reduce splashing.

Figure 2:
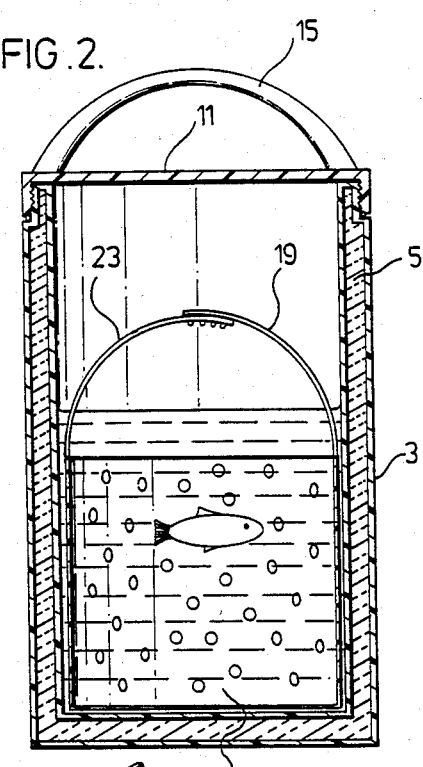
FIG. 2 is an assembled sectional view of the assembly of FIG. 1 with the bag removed and the minnows placed directly in the interior basket of the assembly.
Figure 3:
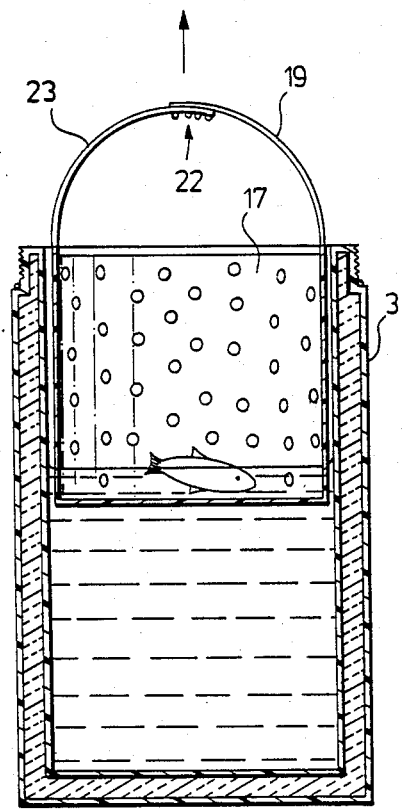
FIG. 3 is a sectional view of the assembly with the lid removed and the basket being lifted from the bucket.
Figure 4:
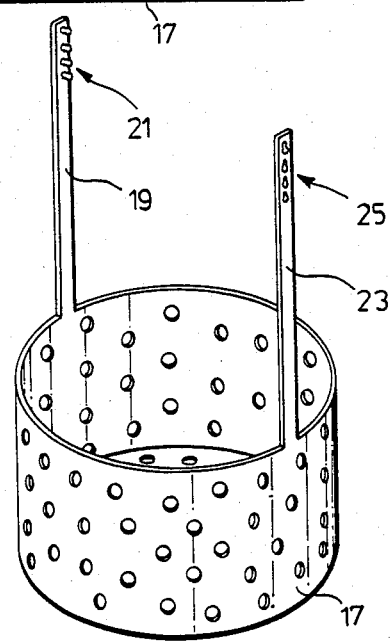
FIG. 4 is a perspective view looking down on the basket from the container assembly of FIGS. 1 through 3.

Also provided as part of the assembly is a strainer basket 17 which fits within the bucket as shown in FIGS. 1 through 3 and which is removeable from the bucket as shown in FIG. 4. This strainer bucket is provided with a pair of handle portions 19 and 23 which are adapted to engage with one another as shown in FIGS. 2 and 3 to form a handle for the strainer basket. These handle portions include a locking arrangement generally indicated at 22 in FIGS. 2 and 3 which comprises male studs on handle 19 and female receptacles on handle 25. As will be seen in all of the figures the male studs are located on the inner surface of handle portion 19 so that when the two handle portions are engaged with one another they project downwardly through the female recesses or openings 25. With this arrangement the weight of the basket when lifted from the bucket tends to enhance locking action of the studs in the recesses.

The locking arrangement described above is one which can be readily released by pushing downwardly on handle portion 25 to release the studs from the recesses. The handle portions as well as the overall basket are formed from a resilient plastic material which has a memory to cause them, once released, to automatically spring to the upstanding position on opposite sides of the basket as shown in FIGS. 1 and 4.

On route to the fishing site the minnow bag with oxygen and minnows trapped therein is placed within the basket in the bucket and sealed by the lid. Once the fishermen gets to the site, the minnows and the water are dumped from the bag directly into the basket. As will be appreciated, the out of the way positioning of the handle portions on the basket as shown in FIGS. 1 and 4 enables easy access to the interior of the basket for moving the minnow bag in and out of place.

Once the minnows and water have been dumped into the interior of the assembly the handle portions are folded inwardly across the top of the basket and engage with one another. If one wishes to then retrieve a minnow the basket is simply lifted from the bucket by its handle to strain the water with the minnows still trapped within the basket. Therefore the minnows are easily retrieved without having to place one's hands in the chilly water which remains trapped within the confines of the bucket itself. If necessary the handle of the basket can again be released to allow the handle portions to automatically spring to the upright position for gaining access to the interior of the basket where the minnows are trapped.

For purposes of enhancing the portability of the assembly the bucket and lid may also be made of a light weight hollow plastic material which has both insulating properties and structural integrity.

It is to be appreciated that the container assembly can be used for other purposes such as for example, open water rather than ice fishing where minnows again would be enclosed within the assembly and sealed against loss even should the assembly be in an inadvertantly tipped or knocked over.

Although various preferred embodiments of the present invention have been described herein in detail it will be appreciated by those skilled in the art that variations may be made thereto without departing from the spirit of the invention or the scope of the appended claims.

The embodiments of the present invention in which an exclusive property or privilege is claimed are defined as follows:

1. A container assembly for receiving fishing minnows and the like, said assembly comprising an outer bucket, a removable lid for sealing said bucket, handle means for carrying said bucket, and a strainer basket for fitting inside said bucket, said strainer basket having a pair of handle portions adapted to detachably engage one another, said handle portions when engaged providing a handle for lifting of said basket from said bucket and when detached from one another being moveable to an out of the way position for gaining access into said basket and being formed of plastic having a memory for springing to an upstanding position to either side of said basket when detached from one another and being resiliently bendable to engage with one another folded across said basket.

2. A container assembly as claimed in claim 1 wherein said lid is threadably fitted to said bucket, said handle means comprising a fixed handle atop said lid in a balanced position for carrying said container assembly.

3. A container assembly as claimed in claim 1 wherein said bucket and said lid are insulated for use of said container assembly in winter ice fishing conditions.

4. A container assembly as claimed in claim 1 wherein said bucket, lid and basket are all formed of plastic.

5. A container assembly as claimed in claim 4 including a locking arrangement comprising male and female locking means for detachably engaging said handle portions, said male locking means being located on an inner surface of one of said handle portions so as to protrude downwardly through said female locking means to enhance locking of said locking arrangement by weight of said basket when said handle portions are engaged with one another.

6. A container assembly as claimed in claim 2 wherein said bucket has a threaded exterior for receiving said lid away from splashing within said bucket.

* * * * *